2,345,916

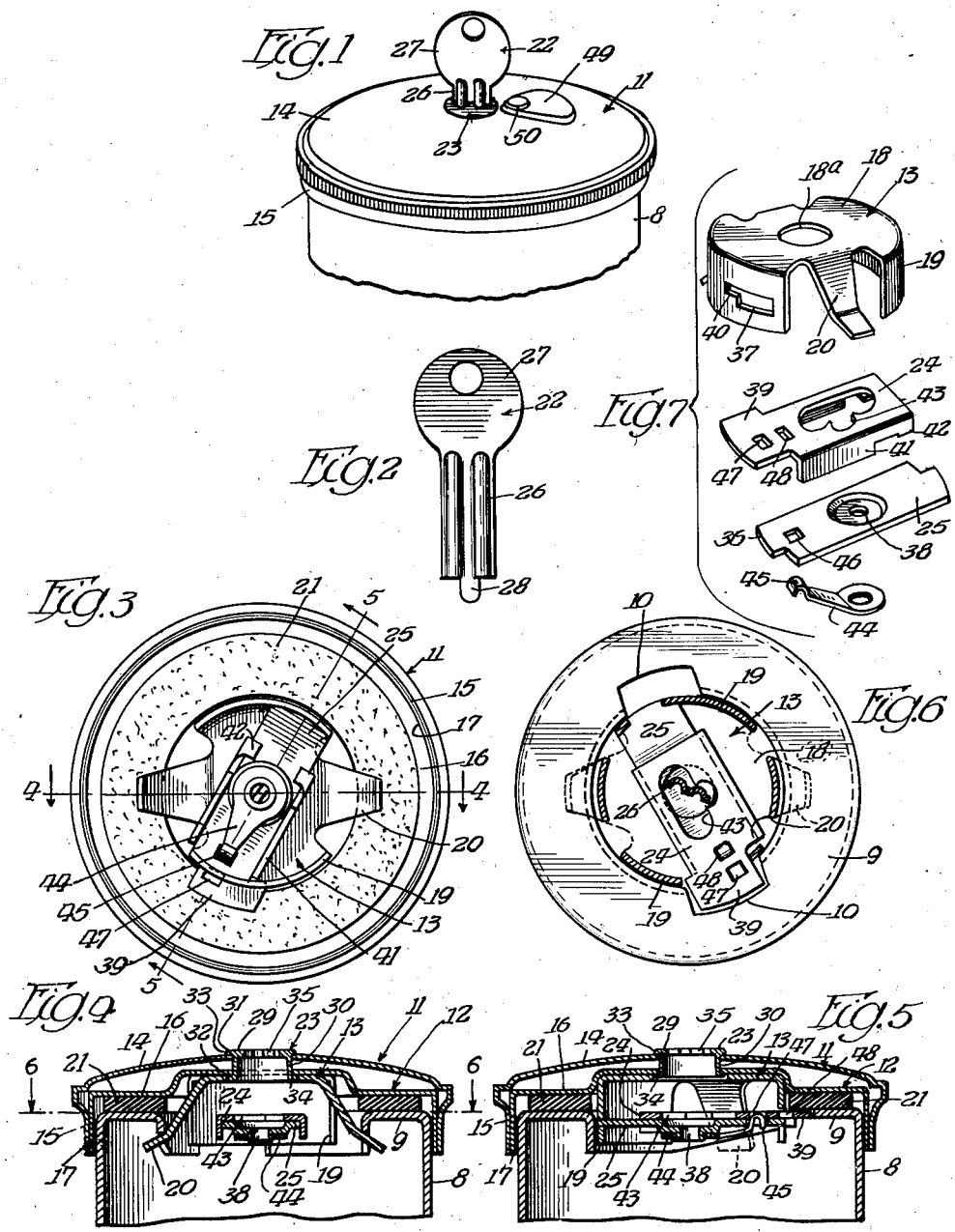
April 4, 1944.  W. F. CLARK ET AL  2,345,916
CAP FOR GASOLINE TANK FILLER PIPE
Filed Feb. 25, 1942
Inventors
Willard F. Clark
Benjamin Jelinek
By Fred Gerlach
Atty Patented Apr. 4, 1944

UNITED STATES PATENT OFFICE 2,345,916

CAP FOR GASOLINE TANK FILLER PIPE

Willard F. Clark, Oak Park, and Benjamin Jelinek, La Grange, Ill., assignors to Monarch Tool & Machinery Co., Chicago, Ill., a corporation of Illinois Application February 25, 1942, Serial No. 432,294

2 Claims. (Cl. 70—172)

In general the present invention relates to caps for closing the filler pipes of automobile gasoline tanks or the like. More particularly the invention relates to that type of cap which embodies on the inner side thereof and as attaching or securing means a fixed centrally disposed member having a pair of oppositely positioned outwardly extending fingers which are adapted in connection with application of the cap to the filler pipe first to pass through diametrically opposite notches in an inwardly extending annular flange on the inlet end of the filler pipe and then in response to limited turning or rotation of the cap to swing under the flange and thus lock the cap in place.

One object of the invention is to provide a filler pipe cap of this type which is an improvement upon, and has certain advantages over, previously designed caps of the same general character and is characterized by the fact that it includes simple and novel key controlled means for locking it in its operative position.

Another object of the invention is to provide a cap of the last mentioned character in which the key controlled means for locking the cap in its operative position includes or comprises a lock bolt which is slidably mounted with respect to the finger equipped attaching member and is adapted, after application of the cap to the filler pipe and in response to turning of the key in one direction, to slide into interlocked or interfitting relation with one of the finger receiving notches in the inwardly extending flange on the inlet end of the pipe.

Another object of the invention is to provide a filler pipe cap of the type and character under consideration in which the key controlled locking means is so designed and constructed that it requires no tumblers and the lock bolt is shifted by direct engagement with the inner end of the key.

A further object of the invention is the provision, in connection with a cap of the last mentioned character, of novel mounting means for the key controlled lock bolt.

A still further object of the invention is to provide a lock equipped filler pipe cap which is simple in design and construction and may be manufactured at an extremely low cost.

Other objects of the invention and the various advantages and characteristics of the present cap will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective showing a cap embodying the invention applied to the inlet end of a filler pipe for an automobile gasoline tank;

Figure 2 is a side view of the key which serves as the medium for shifting the lock bolt into and out of its operative position wherein it serves to lock the cap against removal from the filler pipe;

Figure 3 is an inverted plan view of the cap;

Figure 4 is a vertical section on the line 4—4 of Figure 3, showing the cap in its operative position with respect to the filler pipe and illustrating in detail the manner in which the fingers on the attaching member underlie the inwardly extending annular flange on the inlet end of the filler pipe and serve to hold the cap in place;

Figure 5 is a vertical section on the line 5—5 of Figure 3;

Figure 6 is a horizontal section taken on the line 6—6 of Figure 4, the cap being removed and the lock bolt being in its operative position wherein it interlocks with one of the notches in the flange of the filler pipe and prevents loosening or removal of the cap; and Figure 7 is a perspective showing certain parts of the cap in separated relation.

The cap which is shown in the drawing constitutes the preferred form or embodiment of the invention. It is of unitary design or construction and serves as a medium for closing the filler pipe of an automobile gasoline tank or like container. The filler pipe is designated in the drawing by the reference numeral 8 and embodies at its inlet end an inwardly extending annular flange 9. This flange embodies a pair of diametrically opposite notches 10, as shown in Figure 6.

The cap consists of a cup-shaped outer shell 11 and a cup-shaped inner shell 12 and is provided with an attaching member 13 for securing it in its operative position. It is also provided with means for locking it in place. The outer shell 11 of the cap is in the form of a sheet metal stamping and consists of a disc-like concavo-convex top wall 14 and an integral annular depending skirt 15. The upper portion of the skirt 15 is bulged outwards and knurled in order that the cap may be readily gripped and turned in connection with application to, and removal from, the filler pipe 8. The inner shell 12 fits within the outer shell 11 and consists of a disc-like top wall 16 and an integral annular depending skirt 17. It is preferably in the form of a sheet metal stamping and serves to strengthen or reenforce the outer shell. The top wall 16 of the inner shell underlies and is spaced a slight distance beneath the top wall 14 of the outer shell. The skirt 17 of the inner shell fits within the skirt 15 of the outer shell and is secured thereto either by a press-fit or spot welding. When the cap is in its operative position the skirts 15 and 17 surround the inlet end of the filler pipe 8, as shown in Figures 4 and 5. The diameter of the skirt 17 of the inner shell is slightly greater than the diameter of the inlet end of the pipe 8 in order that the cap when mounted on the filler pipe may be readily turned. The outer and inner shells 11 and 12 constitute the body of the cap.

The attaching member 13 is in the form of a sheet metal stamping and consists of a top plate 18, a pair of arcuate depending side walls 19 and a pair of oppositely positioned downwardly and outwardly extending fingers 20. It is disposed within the central portion of the inner shell 12 and serves as a medium for releasably securing the cap in its operative position. The top plate 18 has a central aperture 18a and fits against and is spot welded to the central portion of the bottom face of the top wall 16 of the inner shell 12. The arcuate side walls 19 are disposed diametrically opposite one another and are formed integrally with the top plate 18. The fingers 20 are also formed integrally with the top plate 18. They are positioned at right angles to the arcuate side walls 19 of the attaching member 13 and are of such length that the ends thereof project outwardly of the side walls 19. In applying the cap to the filler pipe the cap is placed over the inlet end of the pipe and is then manipulated so as to bring the outer ends of the fingers 20 into registry with the notches 10 in the inwardly extending annular flange 9 of the filler pipe. Thereafter the cap is shifted downwards so as to cause the outer ends of the fingers to pass beneath the notches. After this operation the cap is partially turned or rotated so as to bring the outer ends of the fingers into a position wherein they underlie the flange 9. When the fingers are in such position they serve to hold the cap in its operative position. To remove the cap it is only necessary to turn or rotate it reversely until the fingers 20 are in alignment with the notches 10. As soon as the fingers and notches are in alignment the cover may be removed by lifting it from the inlet end of the filler pipe 8. A ring shaped gasket 21 of cork or other compressible material surrounds the side walls 19 and the fingers 20 of the attaching member 13 and underlies the outer marginal portion of the top wall 16 of the inner shell 12. This gasket serves as a sealing medium and is clamped between the top wall 16 and the inwardly extending flange 9 of the filler pipe when the cap is in its operative position.

The means for locking the cap in its operative position comprises a key 22, a rotary plug 23, a lock bolt 24 and a lock bolt supporting strip 25. The key is in the form of a stamping and consists of a shank 26 having an enlarged head 27 at one end thereof and a stem 28 at its other end. The shank is longitudinally fluted so that it is of irregular cross section. The head 27 is adapted to be grasped by the fingers in connection with manipulation of the key. As hereinafter described the key serves as a medium for sliding the lock bolt 24 back and forth between its operative and inoperative positions. The plug 23 is cup-shaped and consists of a disc-like top wall 29 and a cylindrical side wall 30. It is rotatably mounted in a pair of aligned holes 31 and 32 in the central portions of the top walls of the outer and inner shells 11 and 12. An outwardly extending flange 33 at the upper end of the cylindrical wall 30 and an out-turned flange 34 at the lower end of said wall coact with the hole defining portions of the top walls of the two shells to hold the plug 23 against axial displacement with respect to the cap. As shown in Figure 4, the aperture 18a in the central portion of the top plate 18 of the attaching member 13 is aligned with the holes 31 and 32 and surrounds the out-turned flange 34 on the lower end of the cylindrical side wall 30 of the plug. The central portion of the top wall 29 of the plug has a slot 35 for receiving the shank 26 of the key 22. This slot corresponds, so far as contour is concerned, to the cross sectional shape of the key shank 26 and permits the shank to be inserted through the central portion of the cap. The supporting strip 25 is in the form of a stamping and extends between the lower portions of the arcuate side walls 19 of the attaching member 13. It serves as a medium for slidably supporting the lock bolt 24 and has at its ends reduced extensions 36 which fit within aligned slots 37 in said lower portions of the side walls 19 and operate to hold the supporting strip 25 in fixed or rigid relation with the attaching member 13. Said supporting strip is disposed in spaced and parallel relation with the top plate 18 of the attaching member. The central portion of the supporting strip is downwardly bulged so as to receive the lower end of the shank of the key when the key is in inserted relation with respect to the plug. The center of the downwardly bulged central portion of the strip has an aperture 38 for receiving and accommodating the stem 28 of the key. The lock bolt 24, like the supporting strip 25, is in the form of a stamping. It overlies the supporting strip 25 and is slidable longitudinally of the latter. One end of the lock bolt is in the form of an enlargement 39 and this is slidably mounted in a slot 40 in one of the side walls 19 of the attaching member 13 and is adapted when the lock bolt is shifted outwards, to enter and become interlocked with one of the notches 10 in the filler pipe flange 9 and thus lock the cap against removal. The lock bolt is slidably connected to the supporting strip 25 by way of a pair of side flanges 41 and a pair of opposed L-shaped ears 42. The side flanges are connected to, and depend from, the central portions of the side margins of the lock bolt and have sliding contact with the side edges of the supporting strip 25, as best shown in Figure 4. The L-shaped ears 42 are formed integrally with the inner corners of the lock bolt and extend around, and straddle, the supporting strip 25. The central portion of the lock bolt is provided with a T-shaped slot 43 for receiving the lower end of the shank 26 of the key 22. When the key is inserted into the plug 23 to its fullest extent the lower end of the shank 26 fits within the slot 43. When the key is turned in one direction the lower end of the shank, in cooperation with the slot defining portions of the lock bolt, serves to shift the lock bolt outwards into its locked position. Reverse turning of the key results in the lock bolt being shifted inwards into its inoperative or unlocked position. The slot 43 is so shaped or proportioned that when the key is in place in the plug 180° turning of the key results in shift of the lock bolt into its full locked position. Reverse turning or rotation of the key throughout an arc of 180° results in full retraction of the lock bolt. In order releasably or yieldingly to hold the lock bolt 24 in its locked and unlocked positions an elongated spring type detent 44 is provided. This detent is disposed beneath the lock bolt supporting strip 25 and has one end thereof riveted to the portion of the supporting strip that defines the aperture 38 for receiving the stem 28 of the key 22. The other end of the detent is in the form of a U-shaped loop 45 which extends upwards through a cutout 46 in the supporting strip 25 and coacts with a pair of cutouts 47 and 48 in the enlargement 39 of the lock bolt 24. The cutout 48 is so arranged that it is in registry with the cutout 46 when the lock bolt 24 is in its locked position. When the bolt is shifted into such position the loop 45, due to the inherent resiliency of the detent snaps into the cutout 48 and thus holds the lock bolt in place. The cutout 47 is so arranged or positioned that it registers with the cutout 46 when the bolt is in its unlocked position. When the bolt is in such position the loop 45 at the free end of the detent snaps into the cutout 47 and thus holds the lock bolt in its unlocked position.

In order to cover the key slot 35 in the top wall 29 of the rotary plug 23 when the key 22 is not in use a cover plate 49 is provided. This cover plate is mounted on the central portion of the top wall 14 of the outer shell 11 and is pivotally supported by way of a rivet 50 so that it may be swung back and forth between an inoperative position at one side of the plug and an operative position wherein it overlies the top wall 29 of the plug.

When it is desired to apply the cap to the inlet end of the filler pipe 8 the key 22 is inserted into the plug 29 until the lower end of the shank 26 is disposed in the T-shaped slot 43 in the lock bolt 24. Thereafter the key is turned so as to shift the bolt 24 into its unlocked position. After the bolt is in its unlocked position the cap is applied to the filler pipe as hereinbefore described. As soon as the cap is manipulated so as to cause the outer ends of the fingers 20 to pass through the notches 10 in the inwardly extending annular flange 9 of the filler pipe it is turned or rotated so as to cause the fingers to underlie the flange 9. The cap is turned to a point wherein the slot 40 is aligned with one of the notches 10. As soon as the cap is so turned the key 22 is turned throughout an arc of 180° with the result that the bolt 24 is shifted into its locked position wherein the enlargement 39 thereof is in interlocked relation with the adjacent notch 10. After shifting the bolt into its locked position the key 22 is removed. When the bolt is in its locked position the cap is locked against rotation relatively to the filler pipe and hence cannot be removed. When it is desired to remove the cap the key 22 is inserted into the plug and is then turned so as to shift the lock bolt 24 into its unlocked position. As soon as the bolt is in its unlocked position the cap may be removed from the filler pipe.

The herein described cap effectively and efficiently fulfills its intended purpose and may be manufactured at an extremely low and reasonable cost due to its specific design or construction. The means for locking the cap against unauthorized removal from the filler pipe is essentially simple and is characterized by the fact that it does not require the use of tumblers.

The invention is not to be understood as restricted to the details set forth since these may be modified within the scope of the appended claims without departing from the spirit and scope of the invention.

Having thus described the invention what we claim as new and desire to secure by Letters Patent is:

1. A locking device for use with a cap for a filler pipe having at the inlet end thereof an inwardly extending flange with diametrically opposite notches therein, the cap comprising a cup-shaped body adapted to fit over, and be turned relatively to, the inlet end of the pipe, said locking device comprising an attaching member fixedly secured within the central portion of the interior of the body and provided with a pair of oppositely disposed spaced apart depending side walls and in addition a pair of oppositely disposed outwardly extending fingers disposed respectively in the spaces between the ends of the side walls and adapted, when the body is fitted onto the inlet end of the pipe and then turned, to pass first through the notches in the inwardly extending flange and then swing under the flange into an operative position wherein they serve to secure the body in place, a supporting strip extending between, and having the ends thereof secured to, the side walls of the attaching member, and a key controlled lock bolt disposed in parallel relation with, and slidably mounted on the upper face of, the supporting strip, provided at the sides thereof with depending opposed L-shaped ears in straddled and underlying relation with the side margins of said strip, and adapted when the body is held in place by the fingers of the attaching member to be shifted by the key back and forth between a locked position wherein one end thereof projects through a hole in the adjacent side wall into interlocked relation with one of the notches and an unlocked position wherein said one end is out of interlocking relation with said one notch.

2. A locking device for use with a cap for a filler pipe having at the inlet end thereof an inwardly extending flange with diametrically opposite notches therein, the cap comprising a cup-shaped body adapted to fit over, and be turned relatively to, the inlet end of the pipe, said locking device comprising an attaching member fixedly secured within the central portion of the interior of the body and provided with a pair of oppositely disposed spaced apart depending side walls and in addition a pair of oppositely disposed outwardly extending fingers located respectively in the spaces between the ends of the two side walls and adapted, when the body is fitted upon said inlet end of the pipe and then turned, to pass first through the notches in the inwardly extending flange and then swing under the flange into an operative position wherein they serve to secure the body in place, a supporting strip embodying a cutout therethrough and extending between, and having the ends thereof secured to, the side walls of the attaching member, a key controlled lock bolt disposed in parallel relation with, and slidably mounted on the upper face of, the supporting strip and adapted when the body is held in place by the fingers of the attaching member to be shifted by the key back and forth between a locked position wherein one end thereof projects through a hole in the adjacent side wall into interlocking relation with one of the notches and an unlocked position wherein said one end thereof is out of interlocking relation with said one notch, and means for yieldingly holding the lock bolt in either its locked or unlocked position consisting of a leaf spring type detent positioned adjacent the lower face of the supporting strip and having one end thereof anchored to said supporting strip and its other end free and extending through the aforesaid cutout, and a pair of cutouts formed in the lock bolt and adapted to receive said other end of the detent.

WILLARD F. CLARK.
BENJAMIN JELINEK.